US008589359B2

(12) United States Patent
Gurney

(10) Patent No.: US 8,589,359 B2
(45) Date of Patent: Nov. 19, 2013

(54) METHOD AND APPARATUS FOR AUTOMATICALLY ENSURING CONSISTENCY AMONG MULTIPLE SPECTRUM DATABASES

(75) Inventor: David P. Gurney, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 491 days.

(21) Appl. No.: 12/889,016

(22) Filed: Sep. 23, 2010

(65) Prior Publication Data

US 2011/0087639 A1  Apr. 14, 2011

Related U.S. Application Data

(60) Provisional application No. 61/250,602, filed on Oct. 12, 2009.

(51) Int. Cl.
*G06F 17/30* (2006.01)
(52) U.S. Cl.
USPC ........... 707/690; 707/697; 707/670; 713/166; 379/110.01
(58) Field of Classification Search
USPC ................. 707/690, 697, 700, 769; 713/166; 379/110.01
See application file for complete search history.

(56) References Cited

U.S. PATENT DOCUMENTS

| | | | |
|---|---|---|---|
| 5,796,999 A | 8/1998 | Azagury et al. | |
| 6,496,944 B1 | 12/2002 | Hsiao et al. | |
| 7,222,117 B1 | 5/2007 | McGrogan et al. | |
| 7,945,212 B2 * | 5/2011 | Kennedy et al. | 455/456.1 |
| 2004/0171390 A1 * | 9/2004 | Chitrapu | 455/456.1 |
| 2005/0239478 A1 * | 10/2005 | Spirito | 455/456.1 |
| 2007/0223403 A1 * | 9/2007 | Furuskar et al. | 370/278 |
| 2008/0228834 A1 * | 9/2008 | Burchall et al. | 707/202 |
| 2008/0268892 A1 * | 10/2008 | Hamdi et al. | 455/522 |
| 2010/0160013 A1 * | 6/2010 | Sanders | 463/6 |

OTHER PUBLICATIONS

Gurney, D., "Whitespace Database Computational Practices," Draft Version 0.4.3, Sep. 2, 2009.
"Second Report and Order and Memorandum Opinion and Order," Federal Communications Commission, FCC 08-260, Nov. 14, 2008.

\* cited by examiner

*Primary Examiner* — Baoquoc N To
*Assistant Examiner* — Andalib Lodhi
(74) *Attorney, Agent, or Firm* — Barbara R. Doutre

(57) ABSTRACT

An apparatus and method of providing accurate and consistent open spectrum results for secondary devices from different geo-location databases is presented. The results, which may be independently derived by each database, are independent of the database queried. The comparison permits some amount of latitude in spatial and temporal consistency between the databases as errors are only indicated if the temporal or spatial discrepancies are pervasive. In addition, large percentages of different locations showing discrepancies when compared also lead to corrective action being taken. Corrective actions that may be taken include forcing problematic databases to update, shunting requests by secondary devices in the problematic locations to acceptable databases or shutting down the problematic databases entirely.

20 Claims, 11 Drawing Sheets

METHOD AND APPARATUS FOR AUTOMATICALLY ENSURING CONSISTENCY AMONG MULTIPLE SPECTRUM DATABASES

RELATED APPLICATIONS

This application claims benefit under 35 U.S.C. §119(e) from U.S. Provisional Patent Application No. 61/250,602, commonly owned with this application by Motorola, Inc., filed Oct. 12, 2009, and entitled "METHOD AND APPARATUS FOR AUTOMATICALLY ENSURING CONSISTENCY AMONG MULTIPLE SPECTRUM DATABASES", the entire contents of which being incorporated herein by reference.

TECHNICAL FIELD

The present application relates generally to cognitive radio communication systems and more particularly to a method and apparatus for automatically ensuring consistency among multiple spectrum databases.

BACKGROUND

In wireless communications, different frequency bands are set aside by the Federal Communications Commission (FCC) for different purposes. Users of a particular frequency band may be primary or secondary, licensed or unlicensed. Existing users of a particular frequency spectrum are called incumbents of that spectrum. Secondary devices, such as unlicensed Cognitive Radio (CR) units, rely on dynamic spectrum access techniques to gain access to spectrum that is used by incumbents (e.g., primary licensed users), also called protected devices. For example, in the Television White Space (TVWS) spectrum, typical incumbents include television and wireless microphone transmitters.

The transmission characteristics of many licensed incumbent systems and devices are contained within regulatory databases such as the FCC's Consolidated Data Base System (CDBS) and the FCC's Universal Licensing System (ULS). Other incumbent users, such as authorized wireless microphone users or cable headend receivers may need to register with a particular database to obtain protection for their operations. These characteristics include transmitter location, effective radiated power (ERP), antenna patterns, and antenna height above average terrain (HAAT) in a variety of frequency bands. The FCC has issued operating rules for a number of different frequency bands. For example, the TVWS rules require that secondary devices operate in the television band access a geo-location database in order to determine open spectrum (i.e., channel availability) before selecting and transmitting on a particular channel. One example of a geo-location database is a TVWS databases. The geo-location databases, which typically cover overlapping geographic areas, may be run by different third-party vendors and offer different services in addition to determining the channel availability. According to regulatory guidelines, each vendor will be responsible for accessing the regulatory databases and computing incumbent protected service areas (i.e., contours) to determine channel availability at a particular location of the secondary device, based on the operating rules for the band.

However, there are a large number of steps and computations required to determine channel availability information. Moreover, the computation process is relatively loosely specified under current operating regulations. This may result in inconsistent incumbent protection results between the different geo-location databases due to various issues such as differing protection algorithm quantization/interpolation methods, geo-spatial reference points when channel availability results are gathered from multiple databases, or times in which the protection data in each geo-location database is updated. Moreover, the geo-location data or algorithms may become inadvertently or deliberately corrupted during operation. In any event, incorrect channel availability information may cause impermissible interference to protected devices if the secondary devices begin to operate in the desired location.

It is thus desirable to provide accurate and consistent results independent of the geo-location database queried.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

Figure 1:
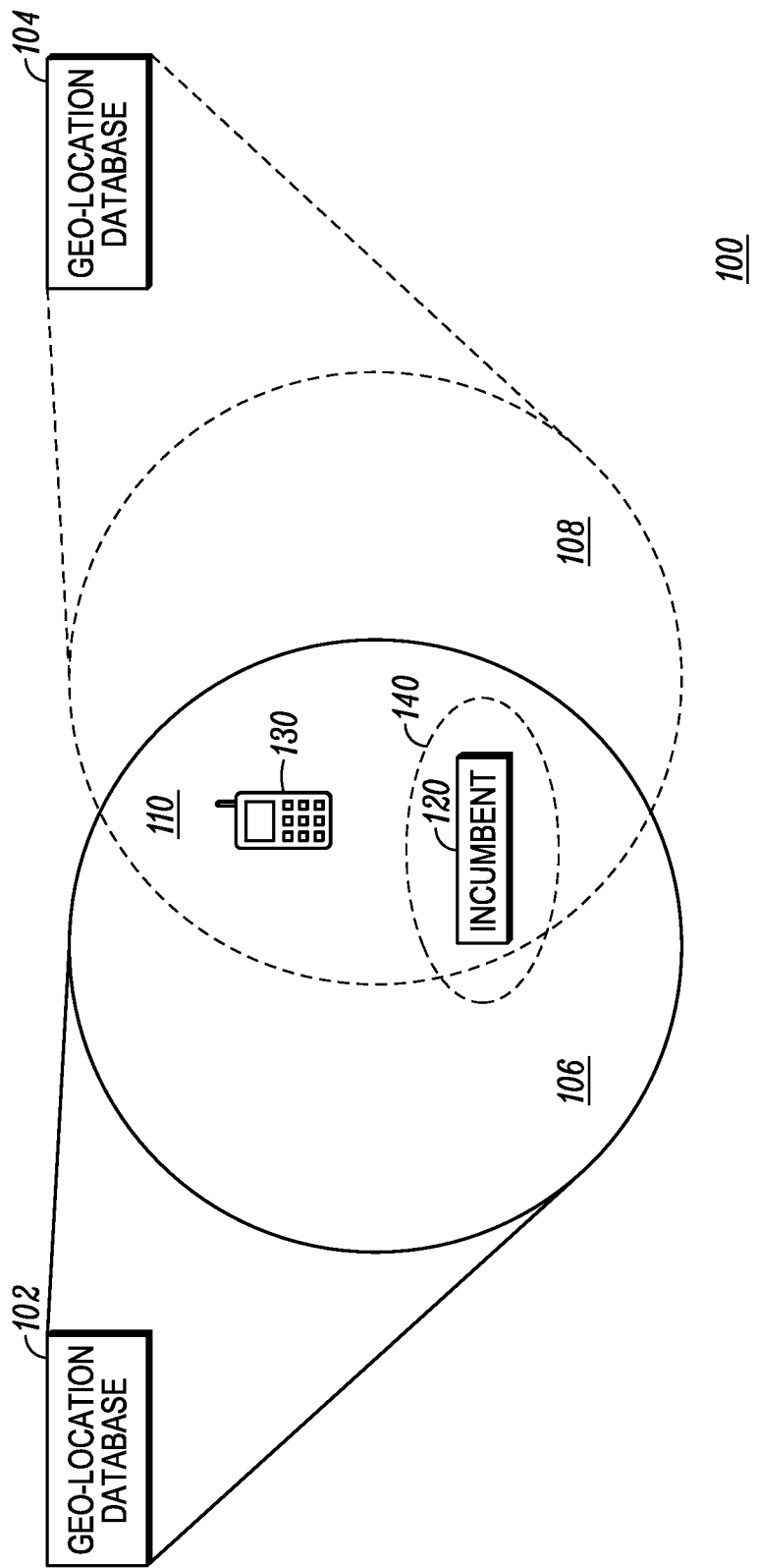
FIG. 1 illustrates one embodiment of a communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Before describing in detail the various embodiments, it should be observed that such embodiments reside primarily in combinations of method steps and apparatus components to assure accurate and consistent channel availability results, which are essentially independent of the geo-location database queried. The comparison is automatic and takes into account spatial and temporal consistency issues between the databases, whose results are independently derived, allowing small discrepancies to exist while retaining overall consistency. The comparison permits protected users to remain protected from excessive interference caused by secondary devices accessing the frequency spectrum.

FIG. 1 illustrates one embodiment of a communication system 100 with multiple geo-location databases 102, 104 that cover overlapping geographical areas 106, 108. Within the geographical areas 106, 108 lie one or more incumbent systems (illustrated as incumbent device 120) to be protected and unlicensed secondary device(s) 130 that use open spectrum. The incumbent device 120 broadcasts over a particular channel covering a service area (typically bounded by a protected service contour). Secondary devices 130 within this protected area may not use the particular channel, but may be able to use it outside the protected area.

Note that, for the purposes of this application, the term "incumbent system" typically applies to the licensed users of a band. For example, TV broadcasters are the licensed primary incumbent users of the TV bands. Other licensed users may include wireless microphones (e.g., operating under FCC Part 74 rules) and Broadcast Auxiliary Services (BAS).

The geographical areas 106, 108 may only partially overlap, as shown (in area 110), or may overlap substantially in their entirety. The geographical areas 106, 108 may span particular regions, such as a city, state, portion (e.g., Midwest) of the country, or substantially the entire country. The size of the areas may depend, for example, on physical topology, incumbent device density, e.g., being smaller in an urban environment than in a rural environment due to the larger number of incumbent transmitters in the urban area, or service and processing capabilities of the geo-location database 102, 104. The problems described herein arise in the overlapping area 110 of the geographical areas 106, 108.

One role of the geo-location database 102, 104 is to protect incumbent systems from harmful interference originating from secondary devices. Secondary devices access the geo-location database to determine open frequencies (or channels) for the frequency bands in which they operate at their particular location. In operation, when a particular secondary device requests registration and permissible operating frequencies, it transmits its location information to the geo-location database. This location information may be derived, for example from GPS information (either integrated into the device or determined by a professional installer) or from information obtained from one or more other devices with the ability to determine their own location (e.g., using relative location). The identity and location (among other) information of the secondary device may then be sent from the secondary device over a wired link (e.g., via the internet) or over a wireless link to the geo-location database. The geo-location database determines a list of available channels or a list of maximum allowed transmit power levels per channel at the specified location, depending on device parameters sent with the geo-location database query (e.g., antenna height, whether the device is a personal/portable device or a fixed device). Other operational parameters, such as maximum allowed bandwidth or transmit timing may also be supplied by the geo-location database. This list may be sent to the secondary device for selection (and confirmation) of a particular channel or the geo-location database may select the channel and indicate the selected channel to the secondary device. Secondary device transmit power level limits are often specified in terms of effective isotropic radiated power (EIRP) levels.

As above, for a secondary device to utilize TVWS in the United States, the FCC requires that the geo-location database be accessed based on the current operating location of the secondary device. Such access is currently only required to determine open channels, i.e., those channels offering full power operation, although other value-added operating characteristics (e.g., interference characteristics and link budget estimates, or the maximum allowed transmit power level for the open frequency) may be provided depending on the services provided by the geo-location database accessed. The FCC CDBS and ULS databases maintain information about the licensed incumbent systems in operation. The information stored may include Effective Radiated Power (ERP) level, operating frequency/channel, antenna pattern (including elevation and rotation), antenna height above average terrain (HAAT), antenna radiating center above ground level (RCAGL), service designation, license status, and physical transmitter operating locations in a given band. Note that radial HAAT values may also be utilized by the geo-location databases, which depend upon the choice of a terrain database. With all of the above information available from FCC databases, there are significant opportunities for differing geo-location databases to interpret the incumbent information differently. One example of this is the license status field, which may indicate (as shown below) that a transmitter is being built with "CP" (Construction Permit) status. This station may or may not be on-the-air, and may or may not need protection. Differing geo-location databases may interpret the protection status differently, leading to discrepancies in channel availability information among databases. This is one example of a situation that needs to be quickly detected and corrected. Tables 1 and 2 show an example of FCC-maintained licensed TV transmitter parameters and sample data, and typical allowable protected service contour levels and propagation models, respectively.

TABLE 1

FCC-maintained licensed TV transmitter parameters and sample data

| | |
|---|---|
| Licensee | WXYZ-TV Broadcasting, Inc. |
| FCC Service Designation | DT - Digital television station |
| Channel | 26 (542-548 MHz) |
| License Status | CP (construction permit) |
| CDBS Application ID No.: | 65680 |
| Transmitter Location: | 39° 39' 55.00" N Latitude |
| | 77° 02' 6.67" W Lon |
| Antenna ID No: | 55236 |
| Polarization | Horizontal |
| Effective Radiated Power (ERP) | 1000 kW |
| Antenna Height Above Mean Sea Level | 550 meters |
| Antenna Height Above Average Terrain | 358.2 meters |
| Antenna Radiating Center Above Ground Level | 350.8 meters |
| Directional Antenna | pattern rotation: 90 degrees |
| Relative Field Values for Directional Antenna | 0 degrees: 0.991; |
| | 10 degrees: 0.931; |
| | ... |
| | 290 degrees: 0.962 |
| | 350 degrees: 0.975 |

TABLE 2

Typical protected service contour levels and propagation models for U.S. TV transmitters

| Type of station | Channel | Protected contour | |
| --- | --- | --- | --- |
| | | Contour (dBu) | Propagation curve |
| Analog: Class A TV, LPTV, translator and booster | Low VHF (2-6) | 47 | F(50,50) |
| | High VHF (7-13) | 56 | F(50,50) |
| | UHF (14-69) | 64 | F(50,50) |
| Digital: Full service TV, Class A TV, LPTV, translator and booster | Low VHF (2-6) | 28 | F(50,90) |
| | High VHF (7-13) | 36 | F(50,90) |
| | UHF (14-51) | 41 | F(50,90) |

TABLE 3

Typical Minimum Required Separation Distances for U.S. TVWS

| Antenna Height of Unlicensed Device | Required Separation (km) From Digital or Analog TV (Full Service or Low Power) Protected Contour | |
| --- | --- | --- |
| | Co-channel | Adjacent Channel |
| Less than 3 meters | 6.0 km | 0.1 km |
| 3-Less than 10 meters | 8.0 km | 0.1 km |
| 10-30 meters | 14.4 km | 0.74 km |

TABLE 4

Typical Interference Protection ratios for various incumbent services in the U.S.

| Type of station | Channel separation | Protection ratios | |
| --- | --- | --- | --- |
| | | D/U ratio (dB) | Propagation curve |
| Analog TV, Class A, LPTV, translator and booster | Co-channel | 35 | F(50,50) |
| | Upper adjacent | −17 | F(90,90) |
| | Lower adjacent | −15 | F(90,90) |
| Digital TV and Class A DTV | Co-channel | 23 | F(50,50) |
| | Upper adjacent | −26 | F(90,90) |
| | Lower adjacent | −28 | F(90,90) |

Generally, the geo-location database will compute a protected service contour (or service area) for each incumbent service, using the incumbent transmitter parameters described above, specified protected contour levels (shown in Table 2), and the required propagation model or curve (e.g., FCC F(50,50) or F(50,90) curves, as shown in Table 2 above). Once a protected service contour is computed, a minimum required separation distance can be applied around the protected service contour (as shown in Table 3, for either co-channel or adjacent channel operation). Note that this required separation distance is applied in a direction normal to (i.e., perpendicular to the tangent of) the contour. The area represented by the protected service contour plus required separation distance represents the incumbent's overall protected area (shown as the dashed area 140 in FIG. 1). Secondary devices of all types are typically not allowed to operate with these co-channel protected areas. The size of the protected area varies depending on the class and antenna height of the secondary device (as shown in Table 3). Also note that fixed secondary devices are not currently allowed to operate on adjacent channels inside of these protected areas, while personal/portable secondary devices are allowed to operate on adjacent channels at reduced transmit power levels (40 mW EIRP) inside of these protected areas in the U.S. TV Bands. Outside of the protected areas (for all incumbents), fixed secondary devices are allowed to operate up to 4 W EIRP, and personal/portable secondary devices are allowed to operate up to 100 mW EIRP in the U.S. TV Bands.

Protected entities, such as authorized wireless microphones, or special receive sites (such as TV translator, temporary BAS sites, or cable headend receivers) may need to register with a geo-location database in order to obtain protection. For example, in the U.S., authorized and registered wireless microphone operations are entitled to a 1 km radius circular protected area (i.e., co-channel keep-out zone) centered around their operating location. Similarly, registered receive sites are entitled to a co-channel and adjacent channel key-hole protection zone centered on the receive site. Since protected entities are currently allowed to register with any one of multiple geo-location databases, their information needs to be frequently synchronized between the multiple geo-location databases. This poses additional risk for differing databases having differing protected entity information, which could result in protection information (i.e., channel availability) discrepancies between different databases.

As seen in Table 4, different incumbent systems can tolerate different interference levels. These interference levels may depend, for example, on the type of transmitter or receiver, where the interference is present within the frequency band, and the location within the coverage area where the interference occurs. Some geo-location databases may alternatively use these parameters to compute maximum allowed power levels vs. operating location. The incumbent transmitter parameters are used to compute, for example, the transmitter signal strength vs. geographic location, given a set of generally accepted propagation models, such as FCC approved F(50,50) or F(50,90) propagation models in the example provided above. Similarly, predefined protected service contour levels (defined per type of transmitter station) determine each station's protected service contour or operational area, as described above. These parameters are typically frequency dependent.

In addition to those parameters shown in Tables 1 and 2, other broadcast system parameters, such as transmitter elevation patterns, tolerable receiver alternate channel interference levels, etc., stored in the geo-location databases may also be considered in determining operating parameters (e.g., maximum allowable transmit power level) of the secondary system.

The use of the geo-location database, which may contain information of the various devices in the primary and secondary incumbent systems, may permit estimation of the distance between a particular secondary transmitter and primary and secondary devices. Proximity to the incumbent devices ultimately determines the maximum transmission power levels that the particular secondary transmitter can transmit without causing an unallowable amount of interference to primary systems. Channels may be considered available for secondary use once they permit a given level of transmit power (e.g., 100 mW or 4 W). The determination of maximum allowed transmission power and other operating parameters may be based on various non-interference requirements and the above generally accepted propagation models. The generally accepted propagation models, however, only provide statistical average data for signal reception, and are subject to errors in the field due to a variety of reasons (e.g., terrain variations, antenna variations, etc.). Thus, while propagation models, such as the FCC's F(50,50), F(50,90) and F(90,90) models referenced in Table 2 are well-accepted, they are only statistical indicators of expected field strength and received signal strength (RSSI) levels for a particular transmitter, given an antenna gain. Actual RSSI can vary based on a wide variety of actual operating conditions, including terrain variations, environmental conditions, achieved antenna patterns/gains, etc. The terrain data may be highly detailed and include terrain features accurate to within 30 m or better, as well as land clutter information. Similarly, typical primary receiver interference tolerance levels may vary vs. time as well (e.g., due to improvements in receiver technologies). Since these characteristics and propagation models are used to determine the protected service area for primary incumbent users and allowable secondary interference levels, it is desirable to maintain their accuracy using periodically updated geo-maps (such as that provided by various commercial entities) and system operating characteristics.

Thus, the geo-location database may be able to predict interference both due to on-channel primary and secondary transmitters and transmitter splatter (OOBE) effects falling on-channel from primary and secondary transmitters operating on adjacent and alternate channels. The geo-location database can contain prior knowledge of the transmitter splatter characteristics of the various transmitters operated in the bands. Alternatively, the devices themselves could report their operating transmitter characteristics to the database. In this manner, the geo-location database is able to estimate the total interference level on a particular channel, considering both co-channel and adjacent channel effects from primary incumbent transmitters and secondary cognitive radio transmitters in a given area. For example, an unlicensed secondary device with a poor transmit spectral mask operating two channels away in frequency, but in close proximity to another secondary cognitive radio device, may cause a significant amount of interference to the other cognitive radio device, and significantly lower the channel quality of a previously available (or desirable) channel. The geo-location database could compute these effects, and report the estimated drop in channel quality to the other secondary cognitive radio device operating in the area. These types of calculations can be done on a near real-time basis, as long as the secondary cognitive radio devices report their operating channels (and possibly other system operating parameters such as transmit power level, transmit timing, antenna pattern, or polarization) to the database.

Figure 2:
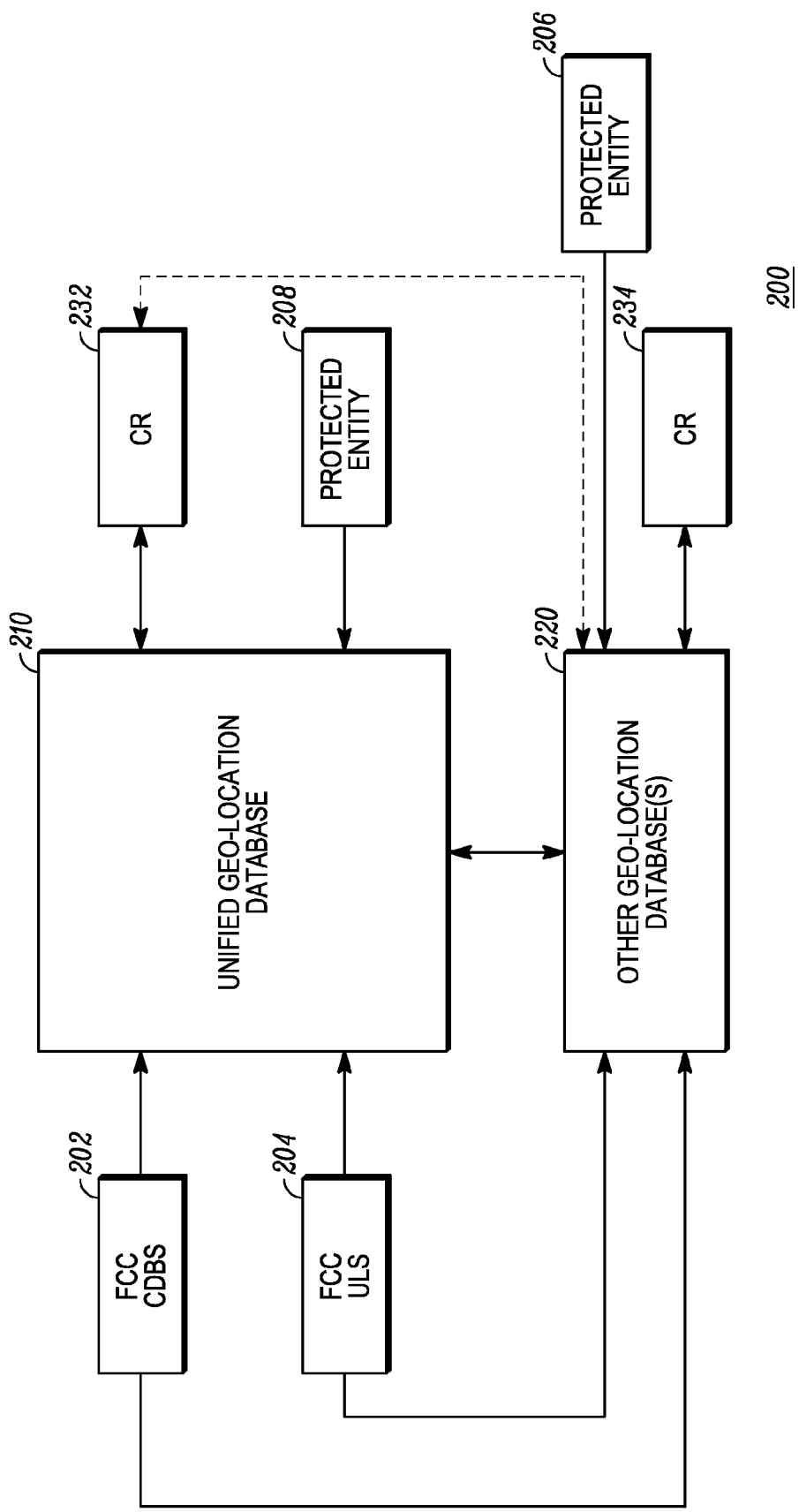
FIG. 2 illustrates one embodiment of a unified geo-location database architecture.

Turning to the system 200 of FIG. 2, a unified geo-location database architecture is shown in which one or more secondary devices (e.g., Cognitive Radio units) 232, 234 communicate with different geo-location databases 210, 220. Each secondary device 232, 234 requests registration and queries for channel availability or maximum allowed transmit power level per channel (e.g., using an internet interface) and may select a particular one of the databases dependent on the services provided by the database or the cost structure of provided services of the database. The geo-location databases 210, 220 access the FCC's CDBS 202, which provides data related to incumbent devices (e.g., television stations) and ULS database 204, which provides Land Mobile Radio (LMR) and BAS data. Protected entities 206, 208 may choose to register with either geo-location database 210, 220. Multiple databases are expected to synchronize protected entity information at predetermined periods. Databases may also synchronize in response to a registration request from the secondary devices 232, 234.

To facilitate protection of incumbent devices from harmful interference generated from opportunistic secondary devices, the information in the FCC databases 202, 204 and protected entity information is used by the geo-location databases 210, 220 to compute incumbent system protection results that depend on the proximity of the secondary device 232, 234 to the incumbent systems. The results can be precomputed, e.g., when the geo-database 202, 204 is updated, for some or all locations within the area and stored for later retrieval or may be computed in real time as secondary device requests come in from various unlicensed secondary devices. In one example, the maximum allowed transmission power for a secondary device is typically computed by first determining if the secondary device is located within a protected service contour of a primary incumbent system, as described above. Alternatively, the protected service contour may be pre-determined for the region by a regulatory body or other party. Generally, the secondary device is not allowed to transmit co-channel inside of a protected service contour to protect incumbent receivers inside the primary system's service contour. However, certain classes of secondary devices may transmit on an adjacent channel at a variable or reduced transmit power, depending on the proximity to a primary incumbent system, as described above.

In one example, it was originally proposed that U.S. TVWS Cognitive Radio devices be allowed to transmit with power levels proportional to the estimated incumbent signal strength levels at a particular location when operating inside of an adjacent channel contour. If outside of the protected service contour however, a Cognitive Radio device may transmit with full power levels if it is a sufficient distance away from the nearest protected service contour edge, or alternatively they may transmit with variable power levels based on interference power constraints at the nearest incumbent receiver (determined by the distance to the nearest protected contour edge).

Turning back to FIG. 2, the secondary device 232 is shown as communicating with (to register/request available channel) geo-location database 210. However, the secondary device 232 may instead communicate with geo-location database 220, as indicated by the dotted line. Although it is desired that the results of these communications be the same, as there is little regulation regarding the information, they may differ due to differences in interpretation of the FCC database data, in the protection algorithms/computations used, or in timing/updates for the calculations. For example, as shown, a protected entity 206 such as a television transmitter or wireless microphone also registers with one of the geo-location databases 210, becoming an incumbent of the system. However, as it may take a substantial amount of time to register the protected entity 206 and thus synchronize the geo-location databases 210, 220, the registering database 220 may give a different result than the database 210 needing to be synchronized. Furthermore, differences between database 210 and 220 results may be due to minor differences in the protection computation methods, due to differing quantization or interpolation methods. Also, differences in a geo-spatial reference grid may also result in differing database results (see below). The geo-location database architecture shown in FIG. 2 may also be referred to as a unified TVWS database architecture. These types of architectures may compute protection (e.g., channel availability) results in real-time when they are queried by a secondary device or they may pre-compute and store the results.

Figure 3:
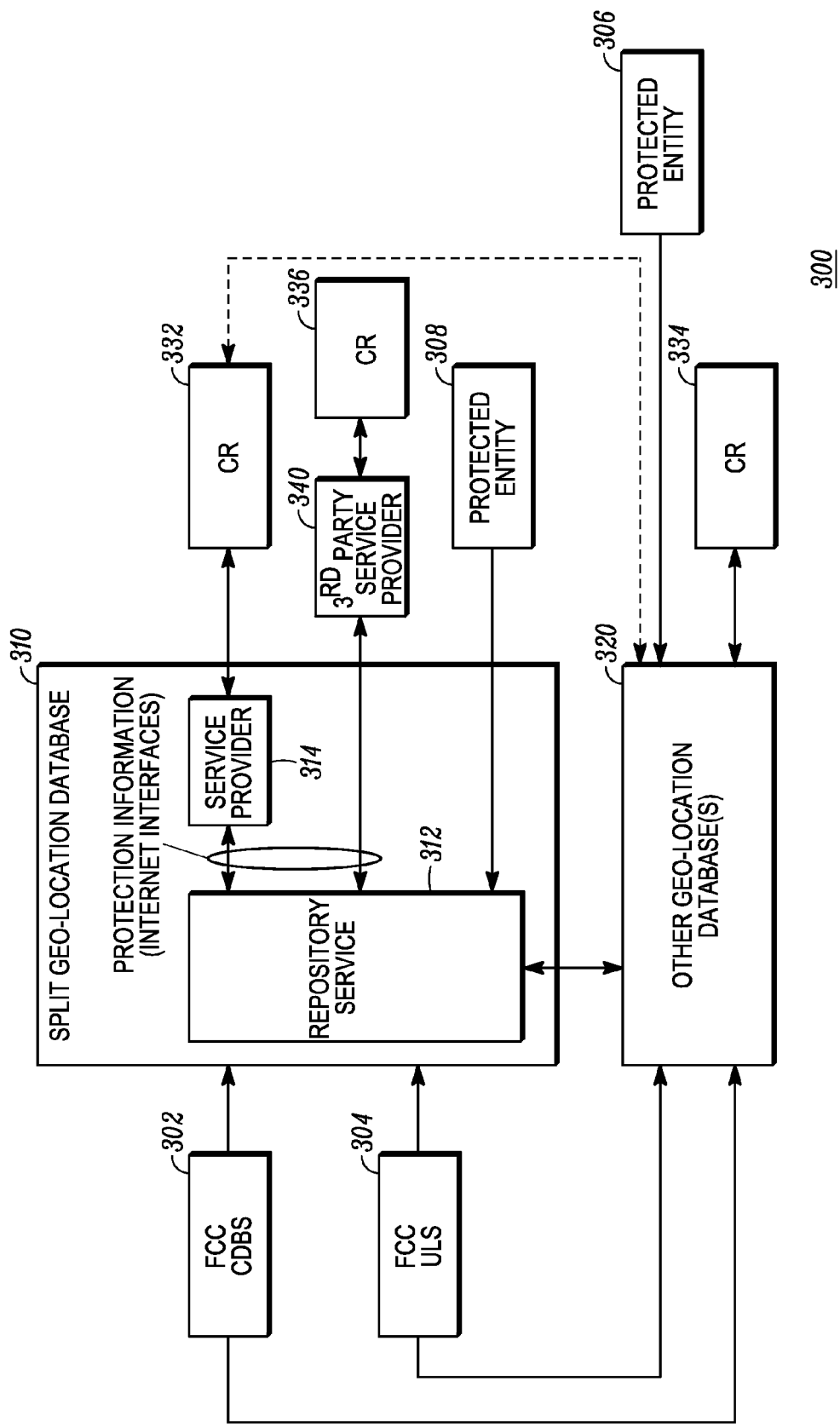
FIG. 3 illustrates one embodiment of a split geo-location database architecture.

FIG. 3 illustrates an embodiment of a system 300 showing a split geo-location database architecture in which one or more secondary devices 332, 334 communicate with different geo-location databases 310, 320. The geo-location databases 310, 320 access the FCC's CDBS and ULS databases 302, 304 as before, and may also independently accept registration information from protected entities (306, 308). The secondary device 332 communicates with geo-location database 310 but again may instead communicate with the geo-location database 320. Similarly, the secondary device 334 communicates with the geo-location database 320. Protected entities 306, 308 similarly may communicate with the geo-location databases 310, 320, respectively. In this case, the geo-location database functions may be split into a Repository Service 312, which performs the protection calculations and distributes the results to Service Providers (314 and/or 340). The Repository Service 312 typically pre-computes protection (e.g., channel availability) results for a given geo-graphic area, often using a spatial grid (shown in FIG. 6) of fine (e.g., 50 m or 100 m) resolution.

Service Providers 314, 340 are responsible for interfacing directly to the secondary devices 332, 336. Functionally, the geo-location database architecture 300 shown in FIG. 3 should produce substantially identical results to the unified architecture 200 shown in FIG. 2.

Figure 4:
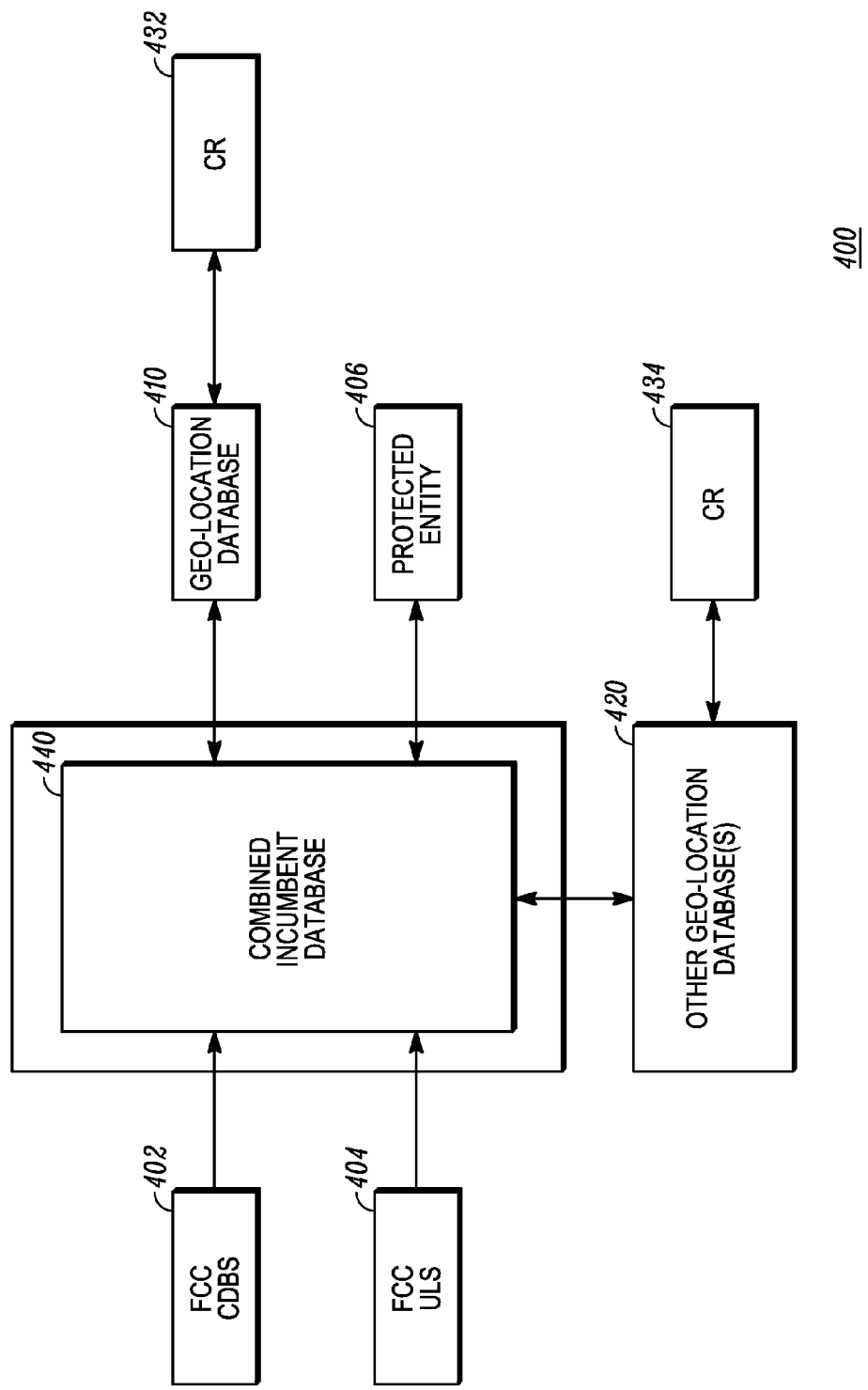
FIG. 4 illustrates one embodiment of a system having geo-location databases.

FIG. 4 illustrates another embodiment of a system 400 whose geo-location databases 410, 420 can employ either the unified or split architectures of FIG. 2 or 3. As shown, the secondary devices 432, 434 communicate with different geo-location databases 410, 420. The geo-location databases 410, 420 in turn communicate with a combined incumbent database (that includes a unified non-public protected entity database) 440. Using the combined incumbent database 440 permits protected entities to go to one database to register and be reasonably assured that their information is reflected in all geo-location databases since all geo-location databases rely on this unified source of incumbent information and no synchronization tasks are needed among differing database registrations. The combined incumbent database 440 accesses the FCC's CDBS and ULS databases 402, 404 and provides incumbent information to the geo-location databases 410, 420. The secondary device 432 communicates with geo-location database 410 to register/request channel availability but again may instead communicate with the geo-location database 420. Similarly, the secondary device 434 communicates with the geo-location database 420. Protected entity 406 communicates with the combined incumbent database 440, not the geo-location database 410, 420.

The combined incumbent database 440 may act as a comparer, continuously or periodically (i.e., at predetermined intervals, such as every several hours, daily or weekly) automatically querying databases for channel availability results at a predetermined number of locations serviced by each database. This function may also be performed elsewhere without any loss of generality. The algorithm is computerized and thus runs automatically—manual triggering by an operator local to or remote from the comparer is optional. Alternatively, this functionality may be passed to another, separate device that has the components (e.g., processor, memory, transmitter/receiver) to perform the comparison. As above, not all locations may be serviced by all databases, but for the databases that service a particular location, the results from all of these databases are compared. The number of locations selected for comparison between the same sets of databases may differ at different times. Similarly, the number of locations selected for comparison between different sets of databases (e.g., covering different areas with each set of databases covering the same area) may differ.

Figure 5:
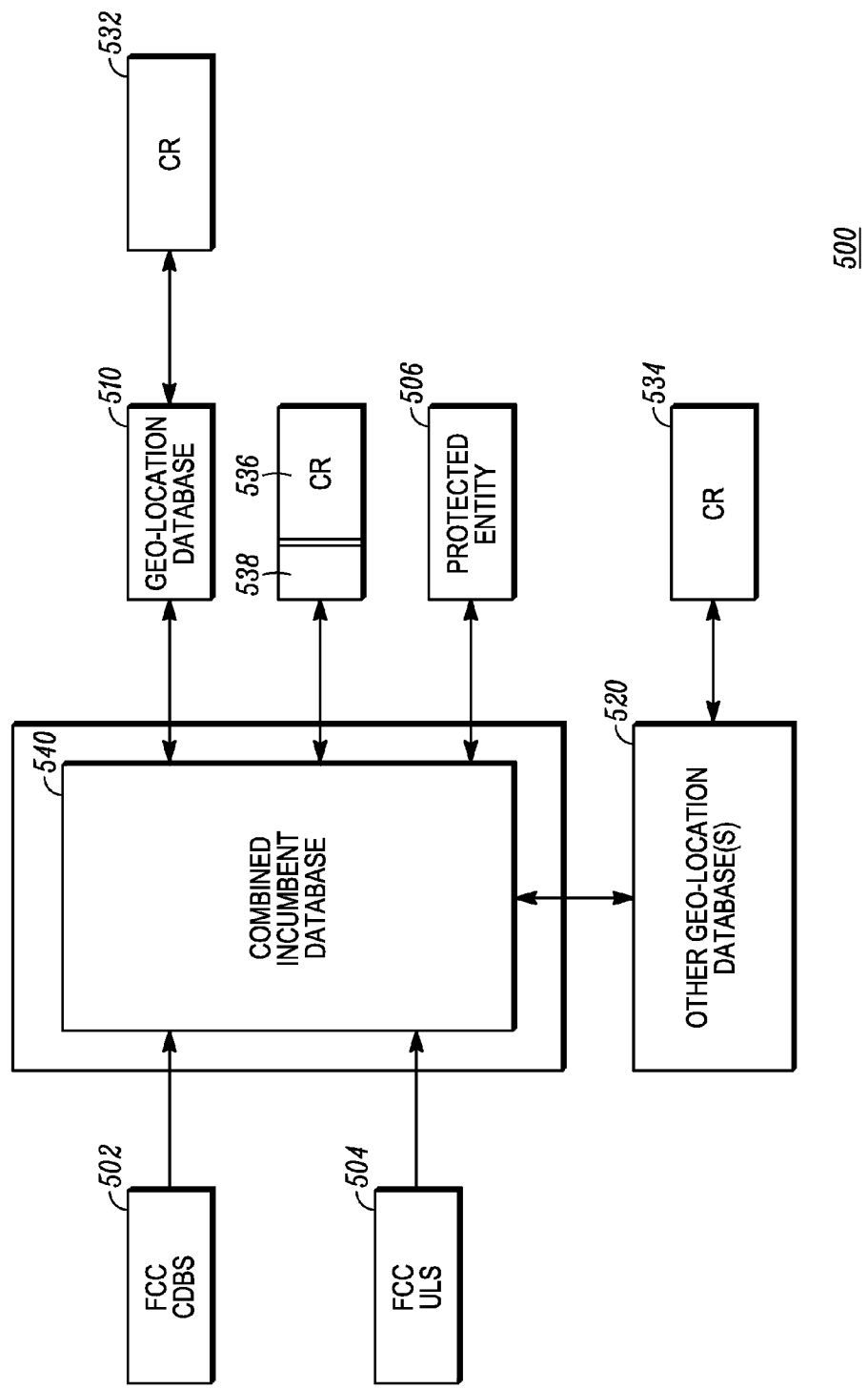
FIG. 5 illustrates one embodiment of a system having geo-location databases.

FIG. 5 similarly illustrates another longer term embodiment of a system 500 whose geo-location databases 510, 520 can employ either the unified or split architectures of FIG. 2 or 3. As shown, the secondary devices 532, 534 communicate with different geo-location databases 510, 520. The geo-location databases 510, 520 in turn communicate with a combined incumbent database 540. The combined incumbent database 540, similar to that shown in FIG. 4, includes a unified non-public Protected Entity database. The combined incumbent database 540 accesses the FCC's CDBS and ULS databases 502, 504 and provides incumbent information to the geo-location databases 510, 520. The secondary device 532 communicates with geo-location database 510 to register/request channel availability but again may instead communicate with the geo-location database 520. Similarly, the secondary device 534 communicates with the geo-location database 520. Protected entity 506 communicates with the combined incumbent database 540, not the geo-location database 510, 520. Secondary devices such as secondary device 536 may communicate directly with the combined incumbent database 540. In this case, however, the secondary device 536 itself determines open channels using an FCC-approved database computation code module 538. The described consistency checking methods could still be applied in this case, but an interface to secondary device 536 would be used to access the results of its internal geo-location database.

In any case, automated consistency checking is provided among the multiple geo-location databases shown. However, while consistency regarding channel availability between the various geo-location databases is provided, absolute consistency may or may not need to be maintained, dependent on the embodiment. In one embodiment, minor spatial and temporal variations between different geo-location databases are allowed, but more significant differences are flagged for inspection by, e.g., the affected database operators and the FCC. Such minor temporal variations include variations between updates, e.g., from several minutes to several hours. Minor spatial variations, generally on the order of 50-100 m are described in more detail below. If the differences are not minor, and/or these significant differences are not resolved in a pre-determined period of time, then the affected database may be shut down or the affected results may be sourced from another, properly functioning, geo-location database or other trusted source. Such consistency checking mechanisms would permit geo-location databases from different database vendors to be used with confidence, even if a small percentage of the results are inconsistent due to algorithmic differences in calculating the protected contours, or differences in incumbent information.

As above, each geo-location database computes protected service contours for incumbent transmitters (e.g., TV stations and other licensed or protected devices) operating in the spectrum. These geo-location databases may also access terrain databases to compute protected coverage areas (e.g., to compute radial HAAT values). The FCC has specified the particular propagation models that are used (e.g., F-curves) when computing incumbent coverage areas, as described above. Other items such as terrain database resolution are not specified, which may lead to minor differences in calculating the protected service areas among different database vendors. Secondary devices are not allowed to operate co-channel inside of these computed protected service areas, although certain classes of devices (e.g., personal/portable units) are allowed to operate on the adjacent channel inside of these areas at a reduced transmit power level. The FCC has also mandated a set of minimum separation distances (i.e., the above-described keep-out zones) from these protected service areas.

Figure 6:
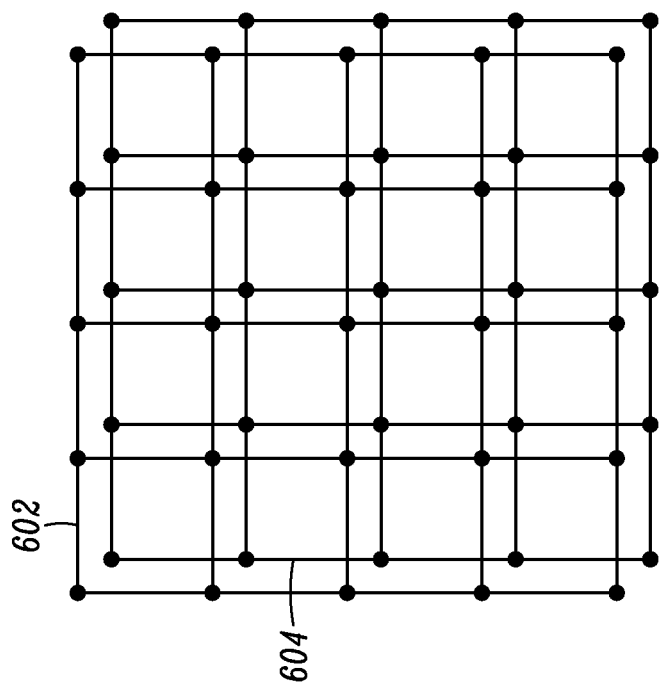
FIG. 6 illustrates one embodiment of spatial grids provided by different databases.

The various computations are complicated enough, however, to offer several opportunities for minor errors or variations to be introduced. Two such avenues are the use of differing quantization schemes or differing data interpolation algorithms between the different databases, resulting in slightly differing predicted coverage areas and keep-out zones among multiple databases. Another avenue is the use of differing spatial grid reference points among between the different databases, which can cause minor differences in results among multiple databases. One example of differing spatial grids provided by different databases having the same grid spacing but different reference points is shown in FIG. 6. Although these spatial grids 602, 604 are shown as having the same individual grid areas, the actual grid points (or areas) may be different in practice. As noted above, some databases may pre-compute protection results on a 50 m spatial grid for the entire range of coverage on, e.g., a daily basis. Other databases may pre-compute results on a 100 m spatial grid. Yet other databases may compute results in real-time as secondary device queries are received at the same or a different (e.g., higher) effective spatial resolution. These situations can lead to differing channel availability or maximum allowed transmit power level results from different databases. Either the temporal or spatial aspects may produce slightly different channel availability results between the different databases.

Protected incumbent information may change on a weekly, daily, or even hourly basis. For example, usage of wireless microphones, especially nomadic ones, could occur on an hourly basis. These updates may not be immediately reflected in the output results of all geo-location databases. The current FCC rules for TVWS require databases to be updated on a daily basis, even though such information may change on an hourly basis. The method described herein allows for such temporal variations, accounting for the time it takes for protected incumbent information to be registered at one of the databases in the system as well as the time it takes for the update to propagate through the entire system.

To provide for these variations, an automated algorithm or device is used that continuously or frequently queries the various geo-location databases in the system, each with the same set of operating locations. Note that the set of queried operating locations would generally be varied (e.g., randomly, or according to some other pattern) from consistency check to consistency check. The results from the differing geo-location databases (e.g., geo-location databases 210 and 220 shown in FIG. 2) are then compared for consistency. Small allowances are made for acceptable spatial and temporal differences between multiple databases, to account for the above effects.

Figure 8:
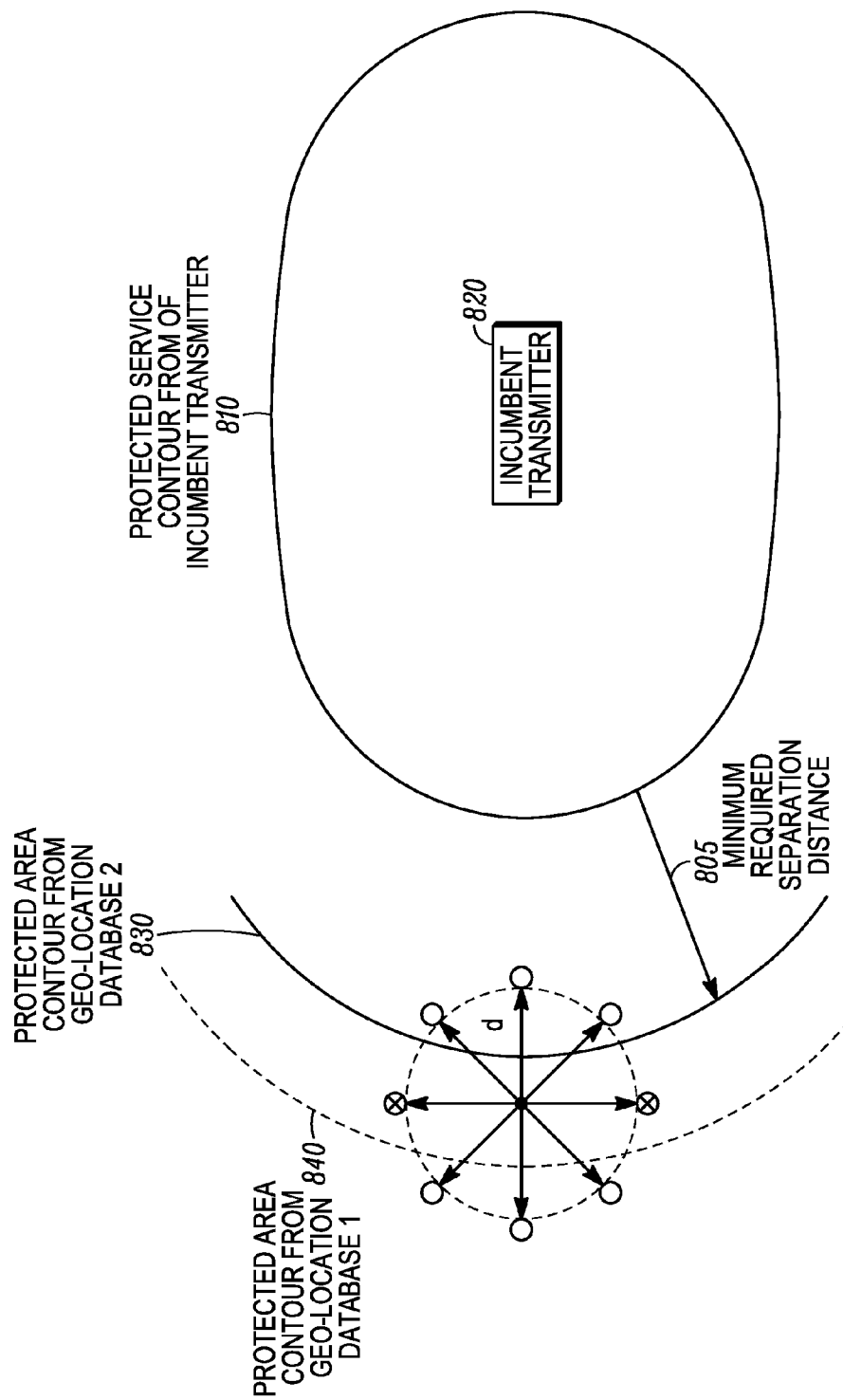
FIG. 8 illustrates an example of spatial discrepancy.

FIG. 8 shows an example of protected area contour differences between two geo-location databases. Recall that the protected area contour defines the boundary between areas where co-channel usage by secondary devices is permitted and not permitted (with operation co-channel permitted outside of this contour, but not inside). For example, as above the co-channel operation protected area contour 830 or 840 (e.g., protected service contour 810 plus required separation distance 805 from Table 3) for a particular TV station may differ by e.g., 50-100 m due to minor differences in calculation methods among geo-location databases. These minor differences will typically result in differing channel availability results around the edges of these protected areas. Generally, as long as these differences do not persist in a direction normal to (i.e., perpendicular to the tangent of) the protected area contour for a significant distance (e.g., 100 m), these differences can be safely ignored, and will not significantly affect incumbent protection. Likewise, for cases where the geo-location databases return maximum allowed transmit power levels (or other CR device operational parameters, such as allowed bandwidth, center frequency, etc.), the results must similarly match within some spatial tolerance level (e.g., within 100 m, again, normal to the protected area contour).

The automated consistency checking mechanism compares a number of relatively small areas between different databases and determines which areas, if any, that have differing channel availability results. In various embodiments, a particular percentage of the total number of locations is selected or an absolute number of locations, such as 1000, is chosen. If all areas of differences are not resolved within some predetermined distance (e.g., within 100 m of the protected area contour), and within some predetermined time period (e.g., two hours), then those areas would be flagged as being in error.

In addition, an overall level of correlation (e.g., 95% minimum matching requirement) between databases may also be enforced in addition to the above checks. In most cases, results from the multiple databases should match identically, as long as the databases are functioning correctly. As mentioned above, most differences are expected to occur around the edges of the incumbent protected areas. The consistency checking algorithm may take advantage of that fact, and check locations known to be near the edges of protected incumbent areas. Alternatively, the algorithm could randomly select database locations to check. Generally, comparisons are made on a channel-by-channel basis for a hypothetical operational area to be checked for consistency. The affected database operators could then inspect any identified differing results (i.e., errors) to resolve the discrepancies.

Figure 7:
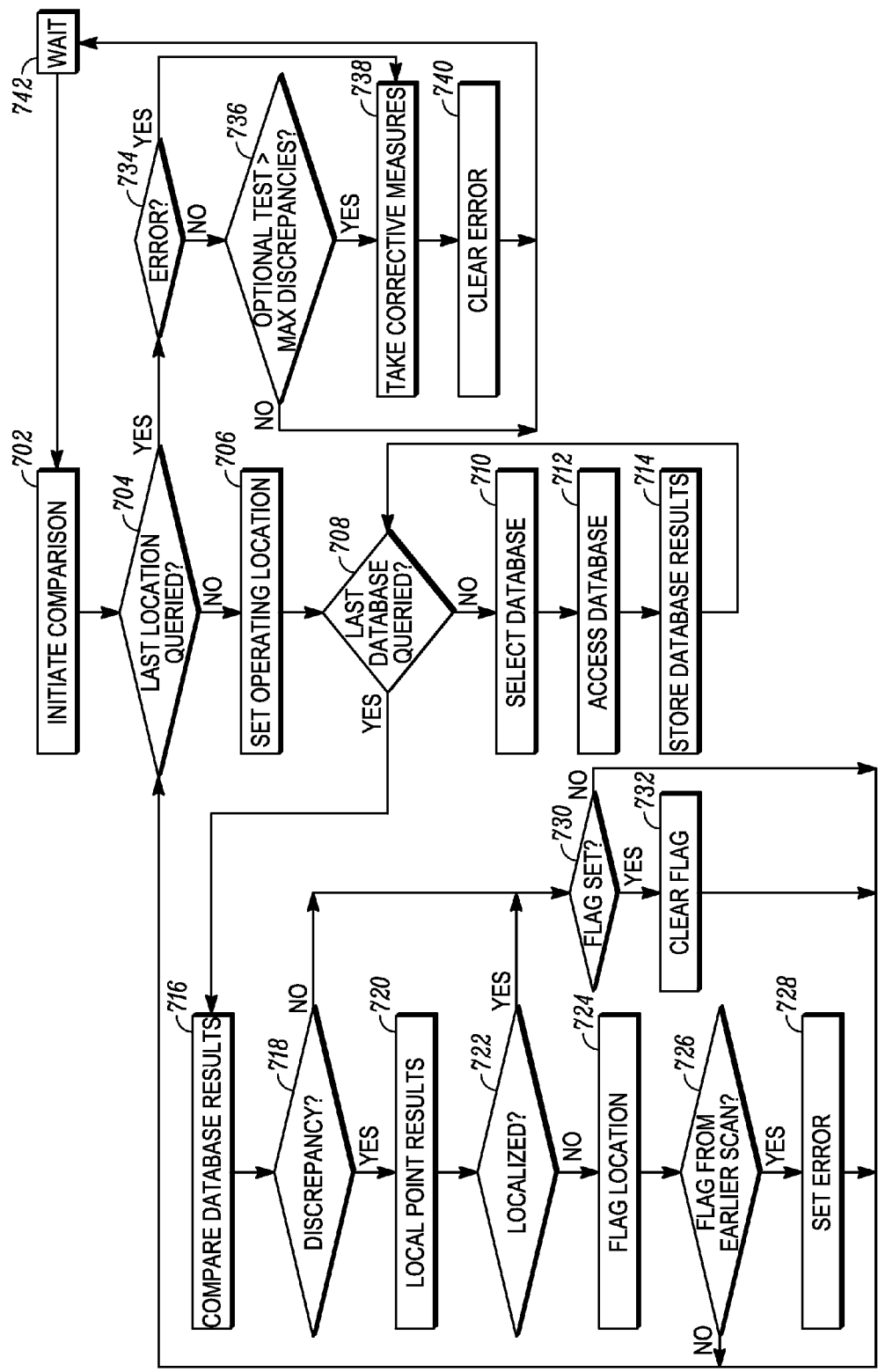
FIG. 7 illustrates a flowchart of an embodiment of a comparison method.

A flowchart of one method of performing the comparison and correcting for errors is shown in FIG. 7. As shown, after the comparison is initiated at step 702, it is determined whether any more locations are to be selected at step 704. These locations can be selected randomly or according to some pattern each time the comparison is initiated (if no flags or errors exist) or after a predetermined period of time. Alternately, as the problematic locations may be localized to a small percentage of the total grid area, the locations can be predetermined and based on, e.g., topological and/or known incumbent transmitters. In any event, if more locations are to be used, a location is selected at step 706 and it is then determined whether any more geo-location databases are to be compared at step 708. If so, a remaining database is selected at step 710, the information transmitted at step 712, and the result from that particular database obtained and stored at step 714 before returning to step 708.

If all of the databases have been queried for the same location, the stored results are compared at step 716. It is then determined whether any discrepancies between the database results exist at step 718. If discrepancies exist, then the results at one or more points local to the location may be tested for each database at step 720. At step 722, it is then determined whether the discrepancy is localized at one or more of the databases. At step 724, for each database, the location is flagged and stored if the discrepancy is not localized. It is next determined whether the same discrepancies (at the same locations for a predetermined time period) existed in an earlier comparison at step 726. If a discrepancy exists at the same location in the earlier comparison, it is established as an error at step 728.

The earlier comparison (at the same location) can be the comparison immediately preceding the present comparison or may be a comparison older than the immediately preceding comparison. For example, comparisons may take place continuously, each comparison taking several minutes, but the system may allow a period of time of several hours or days for a discrepancy to be resolved before indicating that an error exists. In this case, for comparisons occurring before this period ends, the locations selected for assessment may be different or may be the same between various comparisons. A history of comparisons at the same location can be retained to determine if an error continues to exist or is has been corrected and, e.g., a new protected device registered in the meantime. In general, however, it may only be necessary to determine whether discrepancies continue exist at two points in time separated by the desired period. Thus, if it is determined that no discrepancies between the database results exist at step 718 (and a sufficient amount of time has passed) or the discrepancy is localized at all databases then it is determined at step 730 whether a flag has previously been set. If it is determined that a flag was set at that location, the flag may be cleared at step 732. Alternatively some or all flags (and errors) may be retained for later analysis.

Returning to FIG. 7, whether or not an error is determined at step 728, the process returns to step 704 and continues to compare results between databases for particular locations until a predetermined number of locations has been selected. It is determined at step 734 whether any errors exist. If no errors exist, at step 736 it is determined whether a maximum amount (number/percentage) of discrepancies has been exceeded. If errors are present or if the maximum amount of discrepancies is exceeded, corrective action is taken at step 738. The error may then be cleared at step 740 or may remain in a history table in memory of the comparer. After this, whether or not an error exists or if the maximum amount of discrepancies is not exceeded, the process may wait a predetermined amount of time at step 742 before again initiating the process at step 702. This waiting period is optional, as noted above.

Note that several features of the process of FIG. 7 may be changed. For example, rather than comparing results from different databases at the same location immediately as shown, the inner and outer loops can be swapped so that the results from all locations selected for a particular comparison are obtained from a particular database before moving to the next database and obtaining the results from the same locations from that next database. In this case, the results from all databases are compared only after all of the results for every database is obtained, rather than the results for a single location as shown in FIG. 7. Additionally, steps such as 734 and 736 can be interchanged. Also, as noted, several steps are optional.

There are a number of ways in which corrective action in step 738 can be taken. For example, if there is an odd number of databases present or a majority of databases with nearly the same channel availability results (within the above tolerances), the majority results could be substituted for the significantly differing (i.e., errored) database results. Of course, if there is some type of trusted reference available, those results could be substituted instead. In this case, the database(s) could be directed to substitute the majority/known results for a particular period of time, after which the differing results should be resolved. Alternatively, the database(s) could be directed to forward requests for the locations in which errors were determined to one of the majority correctly-functioning databases. In another embodiment, if a significant proportion of errors are detected (i.e., errors in a significant number of the locations selected), the differing database(s) could be shut down. The significant proportion of errors may occur inadvertently such as corrupted data or algorithms in the database(s) or deliberately due to unauthorized tampering with the database(s). In another embodiment, the minority database(s) can be forced to update and another comparison performed, the corrective measures only being taken if the comparison continues to show a discrepancy.

In one embodiment, only a small amount of spatially-correlated differences may be allowed. For example, channel availability differences are allowed to occur between TVWS databases within 100 m of a protected area contour, but must be resolved outside of those boundaries. This could be opposed to an overall allowed target percentage or correlation level of matching results. For example, if 100 different locations are examined for a potential operational area between two databases, and only 8 of them differ, that level may be below a normally allowed percentage difference (of say, 10%). However, if some of those differences (e.g., 3 or more) are in a line going away (i.e., normal) from the protected area contour (e.g. signifying an error/difference of at least 150 m in the protected contour computations performed on a 50 m spatial grid), then those differences may be flagged as significant. This may be true especially if they persist for more than a pre-determined period of time, say beyond 2 hours.

One example of spatial discrepancy is shown in FIG. 8. The protected area contours illustrated by the solid and dashed lines are provided by different geo-location databases. A secondary device provides the location indicated by the solid circle and will receive different results from the different databases. One or more other results can be compared based on the location to determine whether the discrepancy is an actual error or due to minimal protected area contour variation. For example, locations surrounding (e.g., encircling) and at a distance d from the location of the secondary device can be compared to see whether the discrepancy persists, elevating it in importance. The distance d may be one unit on the grid of each database, e.g., 50 m, or some other arbitrary distance that signifies ½ of the maximum allowable spatial errors between databases. As shown, several locations around the originally queried location (e.g., 45° apart, on a circle) can be measured. As long as at least two diametrically opposed points return database results in agreement, the spatial error is resolved within 2 d units (e.g., 100 m), indicating that the discrepancy in results is due to minor computational differences. Alternatively, if the contour is known, only one or two comparisons in a direction normal to (i.e. perpendicular to the tangent of) the protected area contour may be performed. These directions are shown by the thicker arrows in FIG. 8.

As described above, the protected service contour line plus keep out zone forms a demarcation line within which secondary devices are not permitted to operate. However, contour calculation is not an exact science. Generally, it is statistical in nature and does not consider any terrain effects beyond 16 km from each transmitter. Although it may be desirable to specify that each database adhere to the exact same computational algorithm, this may be impractical due to a number of implementation issues. The algorithms may vary somewhat due to the services rendered by the database, the computational time and complexity desired, and the processing power of and components in the database, among other aspects. As a reasonably high degree of accuracy and consistency is desirable in calculations, especially if multiple repositories or databases are present, it is better to specify the maximum allowable error levels than require one particular algorithm to be used. Moreover, as there are bound to be very minor differences in the computational results due to slightly differing grid references, interpolation methods, high-precision (e.g., floating point) comparisons, and processor/compiler selection, it is preferable to specify that differences between database results should be resolved within some small number of spatial grid points or distance (e.g., 100 m). In addition, by keeping the relative error levels small, there is little impact on overall protection.

Figures 9A, 9B:
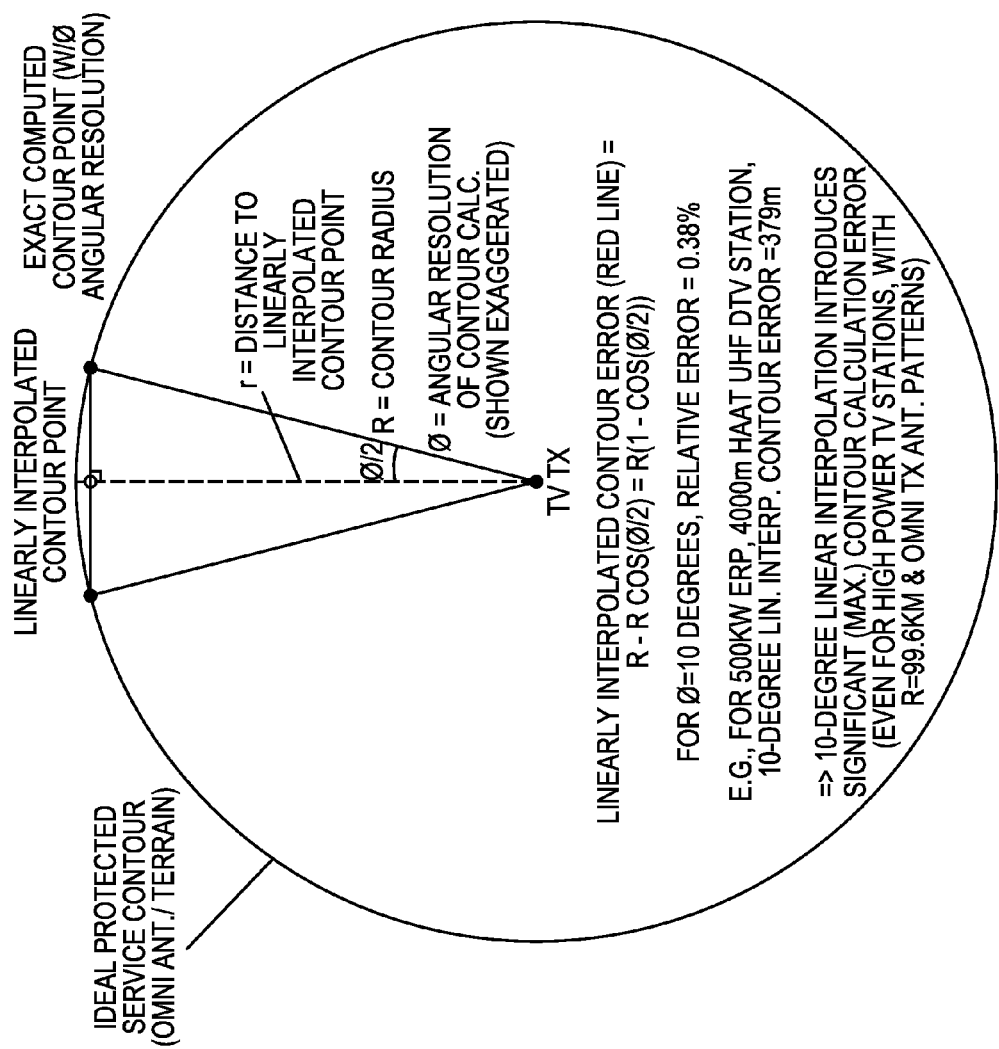
FIGS. 9A and 9B respectively illustrate linear interpolation of a contour and terrain and antenna patterns effects on a contour.

FIG. 9A illustrates a scenario in which the use of linear interpolation may lead to protected contour errors. Given a high power transmitter with a very large service area, since errors are proportional to contour distances (R), a large error may result due to the difference between the actual distance R (e.g., determined at 10° increments) and the extrapolated distance r. For example, a 500 kW ERP, 400 m HAAT omni-directional UHF DTV station has contour radius of 99.6 km results in a maximum contour error of 379 m.

This example assumes an omni-directional antenna with an ideally spherical radiation pattern and flat terrain. However, as shown in FIG. 9B, both terrain and antenna patterns can cause more rapid changes in protected contours. These effects are typically more pronounced for transmitters of lower power and antenna heights. Note that larger contour distances generally mean larger absolute errors. Antenna patterns are generally defined in 10° steps in databases such as the FCC CDBS database, the F-curves in the FCC CDBS database are generally non-linear functions, and real-world RF environments will further complicate the contour calculations. It is expected, for example, that the largest errors occur along contour edges with the highest rates of curvature and that a greater number of potential errors exist near nulls of patterns.

Figure 10:
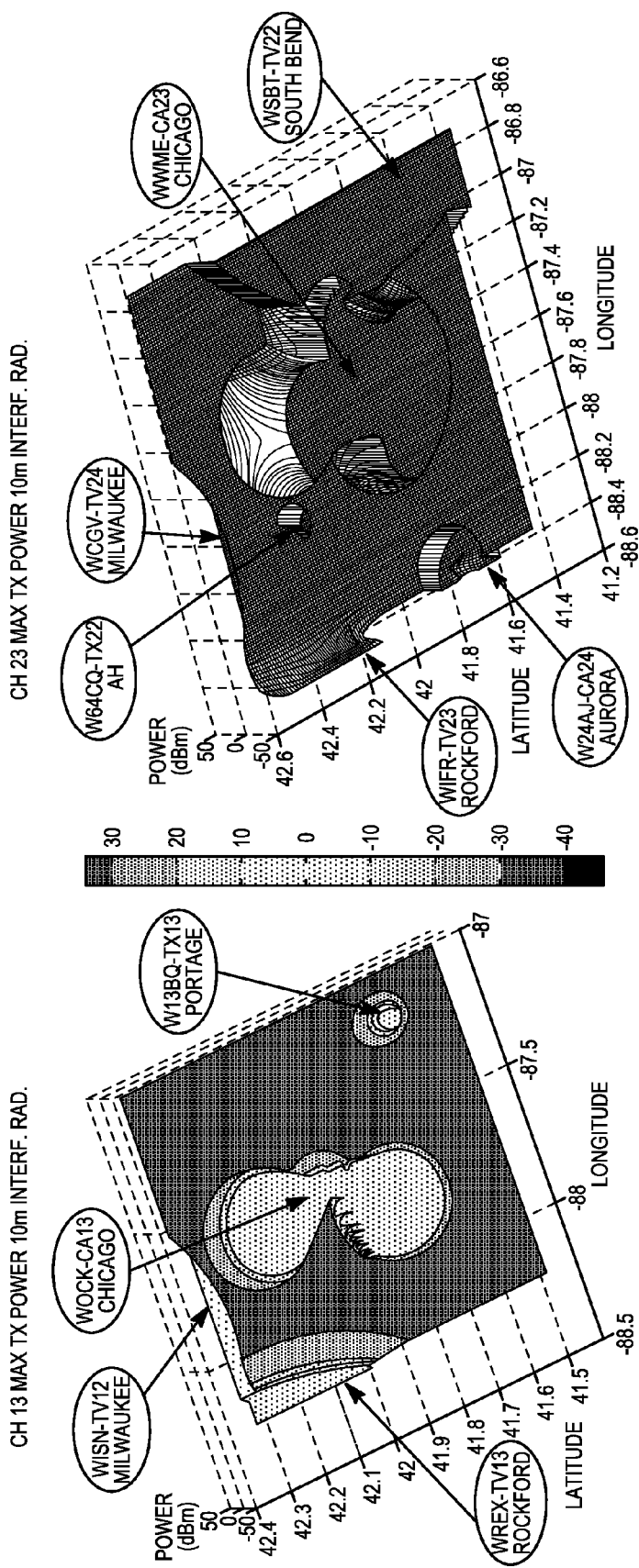
FIG. 10 illustrates an example of maximum allowed transmit power vs. latitude and longitude.

FIG. 10 illustrates an example of computing maximum allowed transmit power level (EIRP) vs. location (latitude and longitude) of the secondary CR device. The charts show the maximum allowed EIRP versus location coordinate for operation on TV channels 13 (left) and 23 (right) in the Chicago area. The bar illustrates the allowed EIRP in dBm to satisfy various co- and adjacent channel interference criteria (described in Table 4 above), taking into account the different protection requirements for different classes of licensed stations.

Figure 11:
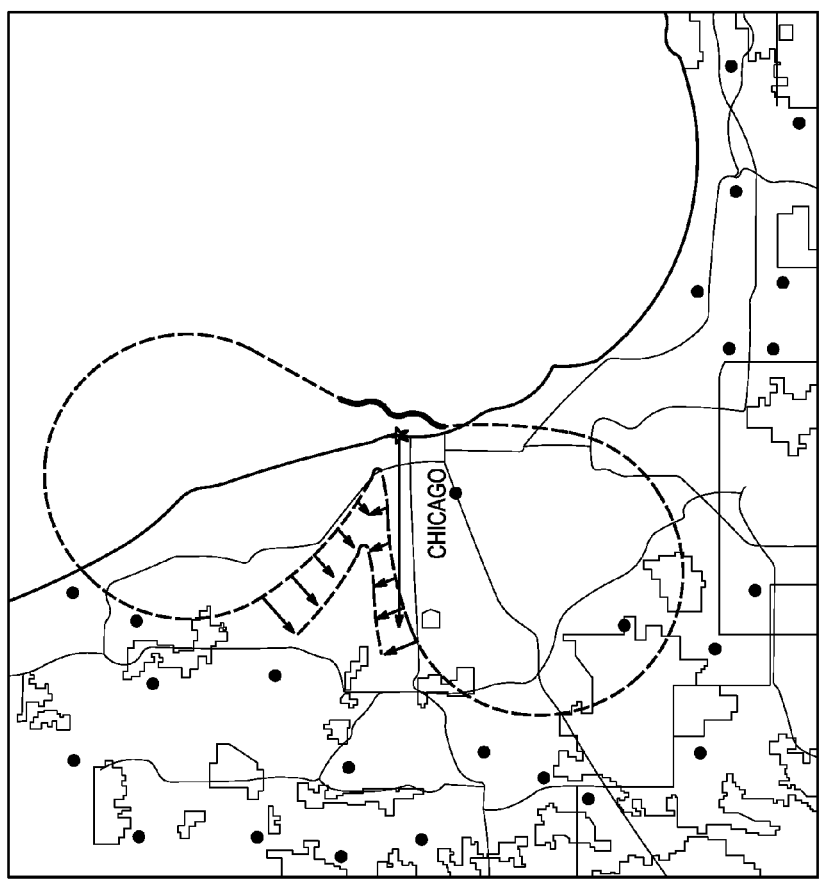
FIG. 11 illustrates an example of nearest contour edge modeling effects.

FIG. 11 illustrates the nearest contour edge modeling effects for a 68 dBu contour around WOCK in Chicago. The keep-out (minimum required separation) distances are applied in a direction perpendicular to tangent of contour. The protected area contour is shown by the black dotted lines. This can significantly alter nulls in the contour patterns. If errors in service contour modeling are small—errors in keep-out zone modeling should also be small as long as properly implemented.

Note that the databases described do not have to cover precisely the same operating regions, frequency ranges, channel bandwidths or other parameters, as long as there is some amount of overlap that is to be coordinated using the above method. Thus, while the technique described applies to TVWS usage as well as Broadband Wireless Internet Service provided in TVWS, it may also be used in other frequency bands (e.g., 3650 MHz, and in other Cognitive Radios). Examples include broadband wireless internet service, WLAN (e.g., 802.11 based), WiMax (e.g., 802.16 based) TVWS communications systems (for both wide area and vehicular area networks), and meshed cognitive radio networks. In addition to the TV bands currently considered, it may be used in several other national and international bands such as the NTIA Spectrum Sharing Test Bed (380-420 MHz) and the 3.6 GHz band. The techniques described above may also be applied to developing and potential IEEE Standards for TVWS (e.g., IEEE 802.22, 802.11y, and 802.16h). A database administrator may be used to oversee multiple TVWS databases and monitor inconsistencies therebetween.

In various embodiments discussed herein, some of the disclosed methods may be implemented as a computer program product operating on one or more conventional processors. The unique stored program instructions forming the computer program product control the processors to implement, in conjunction with certain non-processor circuits, some, most, or all of the functions previously described. The non-processor circuits may include, but are not limited to, a radio transceiver, signal drivers, clock circuits, power source circuits, and user input devices. As such, these functions may be interpreted as steps of a method for communication systems to share spectrum. Alternatively, some or all functions could be implemented by a state machine that has no stored program instructions, or in one or more application specific integrated circuits (ASICs), in which each function or some combinations of certain of the functions are implemented as custom logic. Of course, a combination these approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The computer program product may include a series of computer instructions fixed either on a tangible medium, such as a computer readable medium (e.g., flash memory, CD-ROM, ROM, fixed disk). The medium may be a tangible medium (e.g., optical or analog communications lines). The series of computer instructions embodies all or part of the functionality previously described herein with respect to the device. It should appreciate that such computer instructions can be written in a number of programming languages for use with many device architectures or operating systems. Furthermore, such instructions may be stored in any memory device, such as semiconductor, magnetic, optical or other memory. It is expected that such a computer program product may be distributed as a removable medium with accompanying printed or electronic documentation (e.g., shrink wrapped software) or preloaded with a device (e.g., on system ROM or fixed disk).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims in any application issuing from this application. In addition, in the foregoing Detailed Description, it can be seen that various features are grouped together in various embodiments for the purpose of streamlining the disclosure.

I claim:

1. A method for verifying accuracy of geo-location databases in a cognitive radio communication system comprising of a plurality of protected entities and a plurality of secondary devices, the method comprising:
   registering the plurality of secondary devices at one or more geo-location databases, wherein the one or more geo-location databases maintain a list of available channels from a plurality of channels, reserved for the plurality of protected entities, for communication by the plurality of secondary devices, and wherein the protected entities are licensed users of the cognitive radio communication system and secondary devices are unlicensed users of the cognitive radio communication system;
   determining at least one geographical location to access;
   accessing at least one geo-location database with said geographical location, to obtain database results;
   comparing the obtained database results to a reference result; and
   establishing an error condition for any comparisons that exceed an allowed pre-determined difference.

2. The method of claim 1, wherein determining further comprises selecting a set of geographical locations to access, based on one of the following: a random pattern of locations; a pre-determined pattern of locations.

3. The method of claim 1, wherein the reference result is determined by one of the following: a regulatory database, an approved reference calculation, a second geo-location database.

4. The method of claim 1, wherein the reference result is determined by an average result from other geo-location databases.

5. The method of claim 1, wherein the step of establishing further comprises: allowing a pre-determined difference to exist between the database results and the reference results within a pre-determined time period limit without establishing an error condition; and allowing a pre-determined difference to exist between the database results and the reference results within a pre-determined spatial distance limit without establishing an error condition.

6. The method of claim 1, wherein the step of establishing further comprises allowing a pre-determined difference to exist between the database results and the reference results within a pre-determined time period limit without establishing an error condition.

7. The method of claim 1, wherein the step of establishing further comprises allowing a pre-determined difference to exist between the database results and the reference results within a pre-determined spatial distance limit without establishing an error condition.

8. The method of claim 1, wherein the step of determining at least one geographical location to access further comprises selecting a channel to query.

9. The method of claim 1, wherein said database results comprise one of the following: a channel availability, a maximum allowed transmit power level, a maximum allowed transmission bandwidth, a maximum allowed transmission time.

10. The method of claim 1, wherein the step of establishing further comprises establishing an error when an overall level of correlation is not maintained between the database results and the reference results.

11. The method of claim 1, wherein the method is performed on a periodic basis.

12. The method of claim 1, wherein the reference result is determined by a majority of results from other geo-location databases.

13. The method of claim 1, further comprising shutting down the geo-location database in response to a pre-determined number of errors being established.

14. The method of claim 13, wherein shutting down the geo-location database further comprises sourcing database results from another geo-location database.

15. A cognitive radio communication system, comprising:
   a plurality of protected entities, wherein the protected entities are licensed users of the cognitive radio communication system;
   a plurality of secondary devices, wherein the secondary devices are unlicensed users of the cognitive radio communication system;
   a geo-location database consistency checking device;
   a plurality of geo-location databases, each geo-location database for registering one or more secondary devices from the plurality of secondary device, maintaining a list of available channels from a plurality of channels, reserved for the plurality of protected entities, for communication by the plurality of secondary devices in the cognitive radio communication system, and providing results based on a queried location;
   the geo-location database consistency checking device for transmitting location information to the plurality of geo-location databases, determining spatial and temporal discrepancies between the geo-location database results, determining whether the spatial and temporal discrepancies exceed allowable error levels, and establishing an error condition if said allowable levels are exceeded.

16. The cognitive radio communication system of claim 15, wherein the geo-location database consistency checking device determines temporal discrepancies by performing a comparison of the database results from each geo-location database over a specified period of time to determine whether the temporal discrepancies are less than a predetermined allowable level.

17. The cognitive radio communication system of claim 15, wherein the geo-location database consistency checking device determines spatial discrepancies by performing a comparison of the database results from each geo-location database between at least two diametrically opposed location points surrounding the queried location to determine whether the spatial discrepancies are less than a predetermined allowable level.

18. The cognitive radio communication system of claim 17, wherein the spatial discrepancies are measured in a direction normal to the predetermined protected area contour.

19. The cognitive radio communication system of claim 15, wherein the geo-location database consistency checking device takes corrective action in response to an error condition being noted.

20. The cognitive radio communication system of claim 19, wherein the corrective action comprises at least one of: updating the geo-location database having the error condition, shunting requests to other databases, or shutting down the geo-location database having the error condition.

* * * * *